Feb. 9, 1971 L. C. GUNDERSON 3,562,677

CYLINDRICAL BAND-PASS INTERDIGITAL AND COMB-LINE FILTERS

Filed Nov. 22, 1968

INVENTOR.
Leslie C. Gunderson
BY
Walter S. Zebrowski
ATTORNEY

United States Patent Office 3,562,677
Patented Feb. 9, 1971

3,562,677

CYLINDRICAL BAND-PASS INTERDIGITAL AND COMB-LINE FILTERS

Leslie C. Gunderson, Raleigh, N.C., assignor to Corning Glass Works, Corning, N.Y., a corporation of New York Filed Nov. 22, 1968, Ser. No. 778,201
Int. Cl. H03h 7/10
U.S. Cl. 333—73 9 Claims

ABSTRACT OF THE DISCLOSURE

Cylindrically shaped interdigital and comb-line band-pass filters for VHF and UHF communications systems having a cylindrically shaped housing which forms a first equipotential surface, a cylindrical member within the housing which forms a second equipotential surface, and plural resonator elements capacitively coupled to one another and arcurately distributed within the housing between the two equipotential surfaces. The filter structure is compact and has greater volumetric efficiency than conventional interdigital filters having the same frequency range and band-pass.

BACKGROUND OF THE INVENTION

The conventional interdigital filter is a multi-section band-pass device consisting of a plurality of capacitively coupled rod-like resonator elements disposed parallel to one another in a plane between and parallel to two parallel ground planes. The resonator elements may be of either equal or unequal length and spacing and are usually of either circular or rectangular cross-section. Ordinarily, however, such elements are of the same length, i.e., about one-quarter wavelength at a frequency within the filter pass-band. As viewed perpendicular to the plane containing the elements, the ends of alternate elements are commonly connected, electrically, along one side of the filter and are open circuited at the other ends near the other side of the filter. Such connections give rise to an interdigitated resonator configuration from which these devices derive their name. Input and output connections to the filter elements are provided at each end of the string of resonators through a pair of grounded or floating rod-like impedance matching elements aligned parallel to the resonator string, and coupled capacitively to the end members thereof.

A second multi-section band-pass device known to the prior art is a comb-line filter. This filter is physically similar to the interdigital filter with the exception that the ends of all the elements along one side of the filter are commonly connected electrically to the ground planes while the opposite ends near the other side are open-circuited with respect to each other and the ground planes. Thus, the elements of this type of filter form what appear to be the teeth of a comb, from which configuration the comb-line filter derives its name. Both interdigital and comb-line filters are employed in VHF and UHF communication systems and are characterized by electrical properties of low mid-band insertion loss, low band-pass ripple response, and high out-of-band signal attenuation.

However, because of their relatively flat parallelpiped configuration, such prior art filters are bulky and cumbersome to use in modern communication systems. They also have relatively low volumetric efficiency making it difficult to fabricate them so as to occupy small spaces.

SUMMARY OF THE INVENTION

It is therefore an object of the instant invention to provide interdigital and comb-line band-pass filters whose electromagnetic properties are similar to those of the prior art filters but which substantially overcome the aforementioned disadvantages.

Briefly, in accordance with the instant invention, a cylindrically shaped housing is provided which forms a first equipotential surface. A cylindrically shaped member forming a second equipotential surface is disposed in the housing. A plurality of spaced capacitively coupled resonator elements are arcuately disposed in the housing between the first and second equipotential surfaces and are electrically connected thereto. Terminating means provide electromagnetic access to the elements.

Additional objects, features and advantages of the instant invention will become apparent to those skilled in the art from the following detailed description and attached drawings on which, by way of example, only the preferred embodiments of the instant invention are illustrated.

DETAILED DESCRIPTION OF THE PREFERRED EMBODIMENTS

Figures 1, 2, 3, 4, 5:
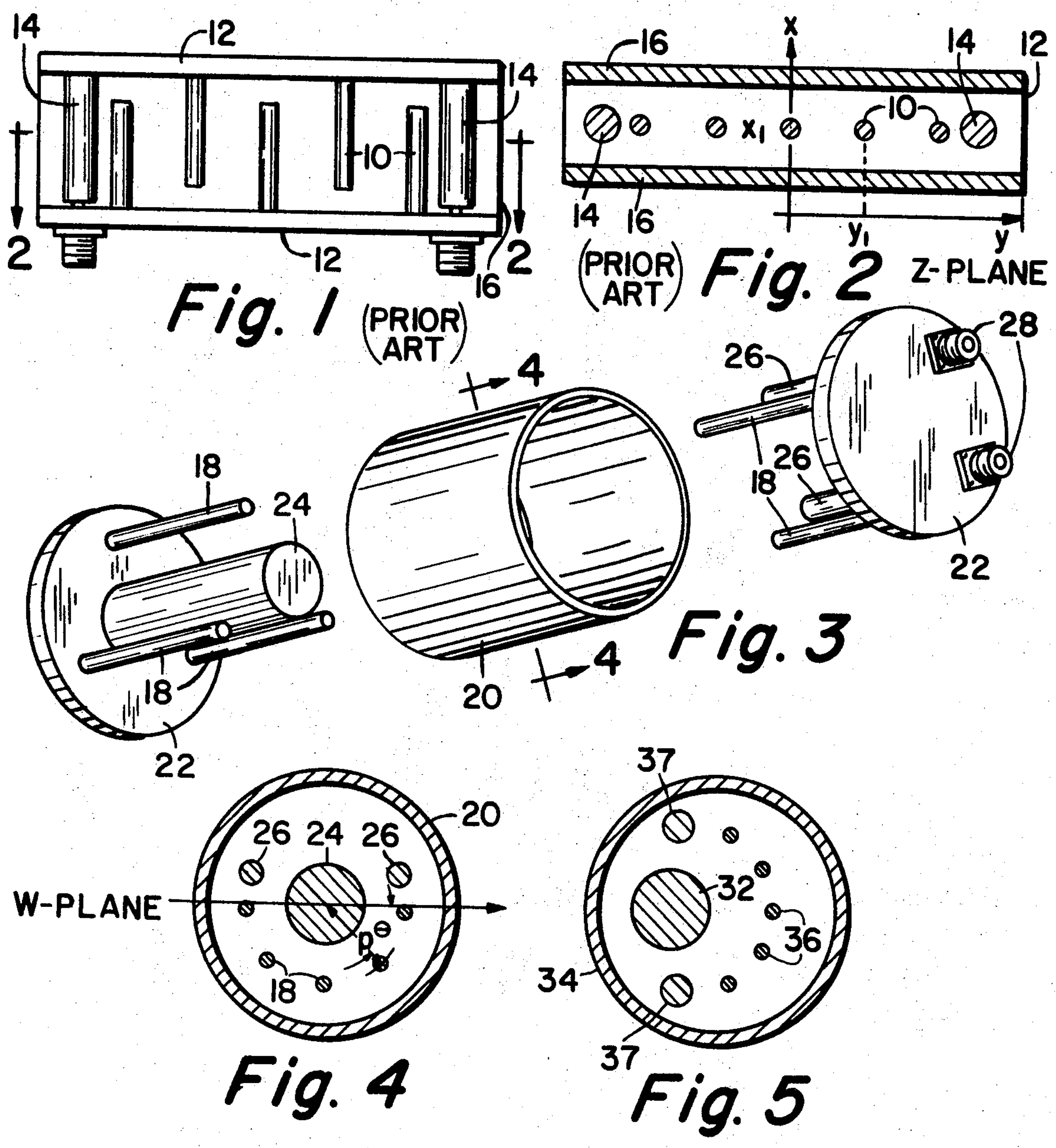
FIG. 1 is a plan view of a prior art interdigital band-pass filter having one of its ground planes removed to expose the resonator elements.
FIG. 2 is a cross-sectional elevation of the prior art filter shown in FIG. 1 having both ground planes in position and being viewed along lines 2—2 thereof.
FIG. 3 is an exploded oblique view of a cylindrical interdigital filter illustrating one embodiment of the instant invention.
FIG. 4 is a cross-sectional view of the cylindrical filter of FIG. 3 as assembled and viewed along lines 4—4 thereof.
FIGS. 5–7 are cross-sectional views of resonator elements and equipotential surfaces of cylindrical band-pass filters illustrating alternative embodiments of the instant invention.

Referring to FIGS. 1 and 2 there are shown two views of a prior art interdigital filter. A plurality of resonator rods or elements 10 are capacitively coupled to one another in a conventional manner. Every other element 10 is electrically connected in common on the same side of the filter due to their attachment to a pair of electrically conductive walls 12 as illustrated. The longitudinal dimensions of the elements 10 are less than the distance between the opposing walls 12 so that the ends of alternately disposed elements 10 opposite their commonly connected ends are open-circuited electrically. A pair of terminating lines 14 are capacitively coupled to the first and last of the row of elements 10 so as to provide means for electromagnetic access to the filter. The elements 10 and lines 14 are substantially parallel to one another in a plane between a pair of electrically conductive equipotential surfaces or ground planes 16. The planes 16 are electrically connected together through the walls 12.

As will readily be appreciated by those skilled in the art, the design of such a filter so as to have the desired properties involves a good deal of mathematical analysis and computation. However, the mathematics of such an analysis has now been well established and for that reason forms an excellent beginning point from which to design the cylindrical filter of the instant invention having the desired electrical properties. I have found that the filter of the instant invention can be designed to have the desired properties by using a prior art filter, having the same desired electrical properties, as a design model. First, the desired properties such as frequency range, band-pass width, permissible ripple response, out-of-band attenuation characteristics, and the like are determined. Next, a prior art filter is designed using the well established mathematical analysis therefor so as to have such properties. Finally, given the design dimensions of the prior art filter, the dimensions of a corresponding cylindrical filter of the instant invention are determined using a relatively uncomplicated mathematical transformation.

Referring to FIGS. 3 and 4 there is shown a cylindrical filter whose electrical properties correspond to those of the prior art filter of FIGS. 1 and 2. The instant filter has a plurality of capacitively coupled resonator elements 18 disposed in a circular arc within a cylindrically shaped housing 20. The elements 18 are alternately connected together electrically along the same end of the housing 20 due to their connections to a pair of electrically conductive end plates 22 as illustrated. The longitudinal dimensions of the elements 18 are less than the longitudinal dimension of the housing 20 such that the ends of the elements 18 opposite the commonly connected ends are open-circuited with respect to the nearest of the end plates 22. As a practical matter it can be expected that there will be some coupling between these open-circuited ends and the nearest of the end plates 22 which is a function of such factors as physical proximity and geometric configurations of the elements 18 and end plates 22 and the frequency of electromagnetic energy applied to the filter.

The housing 20 is electrically conductive and forms a first equipotential surface analogous to one of the planes 16 in FIGS. 1 and 2. A second equipotential surface is formed by an electrically conductive cylindrically shaped member 24 having a length which is substantially equal to the longitudinal dimension of the housing 20 so as to provide an electrical connection between the end plates 22 and both equipotential surfaces. A pair of terminating lines 26 are disposed in the housing 20 on the circular arc formed by the elements 18 and are capacitively coupled to the first and last of the elements 18 in the arc. Electromagnetic access to the filter is provided through a pair of feed-through terminals 28 electrically contacting the lines 26. As is also the case with the prior art filter of FIGS. 1 and 2, the instant filter having an odd number of elements 18, requires that the terminals 28 contact the lines 26 on the same end of the housing 20. However, where a cylindrical filter is provided having an even number of elements 18, the terminals 28 must connect to the lines 26 at opposite ends of the housing 20. Accordingly, with an even number of the elements 18, the terminals 28 will be mounted on opposite end plates 22.

One way in which the proper disposition of the elements 18 can be determined so as to provide a cylindrical filter having the desired electrical properties is to, first, design a prior art filter having the same desired properties using well established techniques. Assume that such a filter has ben designed by any well known technique and is represented by the filter of FIG. 2. A convenient reference frame, designated in FIG. 2 as the Z-plane, the plane containing the filter cross-section, is selected having $x$ and $y$ coordinate axes, and is superimposed on the cross-sectional view of the filter as shown. The center of each of the elements 10 and lines 14 therefore have a unique set of $x$ and $y$ coordinates in the Z-plane as, for example, one of the elements 10 which has the specific coordinates $x_1$, $y_1$ as shown. For convenience only, the $x$ and $y$ axes are oriented such that each of the elements 10 and lines 14 have the same $x$ axis coordinate, designated as $x_1$.

The coordinates $x$ and $y$ for each of the elements 10 and lines 14 are successively substituted into a mathematical transformation W of the form, $$W = e^{x}e^{iy} = pe^{i\theta}$$

to obtain a set of complex quantities represented by W. The term $e^x$, being real, is the coefficient $p$ of the right hand side of the above expression and represents the linear radial coordinate of the elements 18 as shown in FIG. 4. Note that because all of the elements 10 in FIG. 2 have the same value of $x$ coordinates, the disposition of the corresponding elements 18 in FIG. 4 is circular wherein the radius $p$ of the arc is constant. Further, the quantity $e^{iy}$, being imaginary, represents the angular coordinate $\theta$ as given on the right hand side of the above expression and as shown for one of the elements 18 in FIG. 4. The $x$ and $y$ coordinates of each of the elements 10 and lines 14 of the filter of FIG. 2 are successively applied to the above expression to obtain a corresponding set of polar coordinates $p$ and $\theta$ respectively for corresponding elements 18 and lines 26 in the W-plane, the plane containing the filter cross-section.

It should be noted that some prior art filter design dimensions can have $y$-axis coordinates such that $e^{iy}$ is greater than $2\pi$ radians. Should this occur the result would be a cylindrical filter design whose circularly disposed elements would overlap. Such a filter is not physically realizable and the prior art filter causing this condition is too long to provide a cylindrical filter of the type shown in FIG. 4. However, other transformations can be used with the design dimensions of the prior art filter to obtain a corresponding cylindical filter which is physically realizable. Such alternatives are shown in FIGS. 5 through 7.

For example, the prior art filter of FIG. 2 can be used to design a cylindrical filter of the type shown in FIG. 5 by using the hyperbolic transformation, $$W = \frac{e^{z}+1}{e^{z}-1}$$

where W represents the complex coordinates of the elements 36 and lines 37 in the W-plane as shown, and $z$ is the well known complex quantity $x \pm iy$, $x$ and $y$ being the coordinates of the elements 10 in the filter of FIG. 2.

Figures 6, 7:
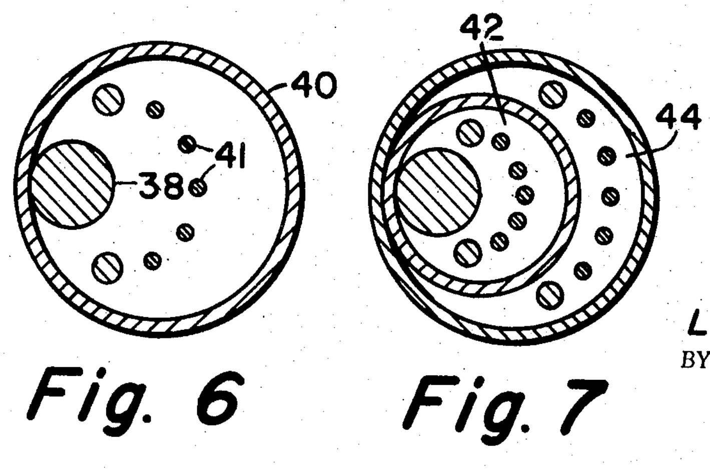

Referring to FIG. 6 there is shown a member 38 and housing 40 representing a pair of equipotential surfaces, and a plurality of resonator elements 41. The instant filter can be designed using the prior art filter of FIG. 2 as a model and applying the transformation, $$W = 1/z$$

to the elements 10 and the lines 14 of the latter in the same manner as previously explained. Note that the member 38 and housing 40 of this example are tangent to one another. This geometric configuration is particularly useful since it permits the stacking of two or more filters 42 and 44 as illustrated in FIG. 7. The filter of FIG. 7 actually being two filters in a single structure is referred to as a composite filter.

Referring again to FIG. 3, it will be noted that the elements 18 and terminating lines 26 are spacially separated from the equipotential surfaces formed by the housing 20 and member 24 by a non-solid dielectric medium such as a vacuum, air or the like. Due to the cylindrical symmetry of the instant filter, it can readily be fabricated so as to have a solid dielectric medium such as fused silica, glass, glass-ceramic material or other well known low thermal expansion high dielectric material. A first equipotential surface is formed by coating the outer surface thereof with a suitable electrically conductive film. The member 24, terminating lines 26, and elements 18 can be formed within the dielectric material by forming cylindrical shafts through the dielectric parallel to the longitudinal axis thereof and coating the shaft defining surfaces with a suitable electrically conductive film. The use of such materials permits the fabrication of a cylindrical filter in a solid dielectric medium, which filter is characterized by a high order of thermal stability, mechanical rigidity, and high dielectric strength.

It will be recognized by those skilled in the art that a second form of prior art filter, namely, a comb-line filter, whose cross-sectional elevation view is identical to the interdigital filter as shown in FIG. 2, can also be converted to cylindrical form, having an end view projection identical with those of FIGS. 4–7 by applying the aforementioned transformations to the conventional model. The difference between the comb-line and the interdigital filter configuration lies in the fact that the former has all of its resonator elements commonly connected on one side of the device. The ends of these elements opposite the commonly connected ends are all open circuited. Since, however, the physical disposition of these elements are of the same form as the conventional interdigital filter, a corresponding cylindical comb-line filter can be readily obtained in the manner previously described with respect to the cylindrical interdigital filter.

Although the foregoing embodiments have been disclosed for convenience as being derived by applying a mathematical transformation to the dimensions of a conventional planar filter used as a model, it is not essential that the filter in accordance with the instant invention be designed in this way.

Although the instant invention has been described with respect to specific details of certain embodiments thereof it is not intended that such details be limitations on the instant invention except insofar as set forth in the following claims.

I claim:

1. A cylindrically shaped band-pass filter for electromagnetic energy comprising a cylindrically shaped housing having an electrically conductive first equipotential surface, a cylindrically shaped member having an electrically conductive second equipotential surface, a plurality of spaced capacitively coupled resonator elements disposed in said housing between said first and second surfaces, said elements being arcuately distributed, means for electrically connecting one end of each of said elements and both ends of said member to said first surface, and terminating means for providing electromagnetic access to said elements.

2. The filter of claim 1 wherein said electrically connecting means comprises a pair of electrically conductive end plates attached to said housing and electrically connecting said first and second surfaces, the lengths of said elements being less than the length of said housing, each of said elements being attached at one end thereof to one of said end plates.

3. The filter of claim 1 wherein said housing comprises a hollow open-ended cylinder of electrically conductive material.

4. The filter of claim 1 wherein said housing, member and elements comprise a cylindrically shaped block of dielectric material defining a plurality of shafts therethrough parallel to the longitudinal axis of said block, the shaft defining surfaces of said block being coated with electrically conductive material thereby forming said elements and member.

5. The filter of claim 1 wherein said elements are electrically connected in common along one end of said housing, said elements being open circuited at the other end of said housing.

6. The filter of claim 1 wherein said elements are alternately connected in common along one end of said housing, said alternately connected elements being open circuited along the other end of said housing.

7. A composite band-pass device for electromagnetic energy having at least two electrically distinct filter sections therein comprising a cylindrically shaped housing having an electrically conductive surface forming the first of a plurality of equipotential surfaces, at least one hollow cylindrically shaped body having a different outside diameter than said housing, the length of said body being equal to the length of said housing, said body being disposed in said housing and having an electrically conductive surface forming one other of said plurality of equipotential surfaces, a cylindrically shaped member having a diameter less than the inside diameter of said body, said member being disposed in said body and having a length equal thereto, said member having an electrically conductive surface forming the last of said plurality of equipotential surfaces, a plurality of sets of resonator elements disposed in said housing, each of said sets being disposed between a diffrent adjacent pair of said surfaces, the elements in each of said sets being arcuately distributed between said pair of surfaces, means for electrically connecting one end of each of said elements to said plurality of equipotential surfaces, and terminating means for providing electromagnetic access to each of said sets.

8. The device of claim 7 wherein, in each of said sets, the elements thereof are electrically connected in common along one end of said housing and open circuited at the other end thereof.

9. The device of claim 7 wherein said elements in each of said sets are alternately connected electrically in common along one end of said housing to said plurality of surfaces, said alternately connected elements being open circuited along the other end of said housing.

References Cited

UNITED STATES PATENTS 2,630,490 3/1953 Richards ---------- 333—73C

FOREIGN PATENTS 1,303,800 4/1962 France ---------- 333—73C

HERMAN KARL SAALBACH, Primary Examiner

S. CHATMON, Jr., Assistant Examiner

U.S. Cl. X.R.

317—256; 333—70